United States Patent
Mo et al.

(10) Patent No.: US 8,243,859 B2
(45) Date of Patent: Aug. 14, 2012

(54) JOINT FREQUENCY AND UNIQUE WORD DETECTION

(75) Inventors: Fan Mo, Stow, OH (US); William H. Thesling, Hudson, OH (US)

(73) Assignee: ViaSat, Inc., Carlsbad, CA (US)

( * ) Notice: Subject to any disclaimer, the term of this patent is extended or adjusted under 35 U.S.C. 154(b) by 397 days.

(21) Appl. No.: 12/630,948

(22) Filed: Dec. 4, 2009

(65) Prior Publication Data
US 2011/0135048 A1 Jun. 9, 2011

(51) Int. Cl.
*H04L 27/06* (2006.01)
(52) U.S. Cl. .......................................... 375/343
(58) Field of Classification Search .................. 375/340, 375/343, 346
See application file for complete search history.

(56) References Cited

U.S. PATENT DOCUMENTS

| | | | | |
|---|---|---|---|---|
| 5,524,127 A * | 6/1996 | Petranovich | .................. | 375/368 |
| 6,560,298 B1 * | 5/2003 | Froehling et al. | ............. | 375/344 |
| 6,693,983 B1 * | 2/2004 | Moher et al. | .................. | 375/341 |

* cited by examiner

Primary Examiner — Don N Vo
(74) Attorney, Agent, or Firm — Kilpatrick Townsend & Stockton LLP

(57) ABSTRACT

Systems, devices, processors, and methods are described for joint detection of frequency and unique word (UW) location(s) for burst transmissions. Embodiments receive a wireless signal. Frequency detection is performed, resulting in multiple possible frequency correlation peaks. A subset of the correlation peaks are each used to perform trial frequency corrections, thereby generating a set of trial sequences. A UW correlation is performed on each of the trial sequences to generate a maximum UW correlation value for each trial sequence. The UW correlation value and the frequency correlation peak value are weighted and combined to generate a joint detection correlation value. The trial sequence having largest joint detection correlation value may indicate the correct transmission frequency and UW location. The jointly detected information may then be used to identify the frequency and start time of the burst transmission, which may then be demodulated, decoded, etc. to recover its payload data.

23 Claims, 8 Drawing Sheets

JOINT FREQUENCY AND UNIQUE WORD DETECTION

BACKGROUND

The present invention relates to wireless communications in general and, in particular, to a satellite communications network.

A typical capability desired from broadband satellite services is the reliable recovery of payload data transmitted via a satellite through burst transmissions. Among other attributes, the burst transmission may be characterized by a transmission frequency (e.g., a carrier frequency) and a transmission time. The burst may be composed of unique word (UW) symbols (e.g., a preamble, post-amble, spread-amble, etc.), signaling header symbols, and payload data symbols. Reliable recovery of the payload data may involve reliable frequency detection and transmission start time detection through the UW detection.

One technique includes detecting UWs in burst transmissions using coherent detection, in which the UW symbols are detected only after frequency detection is complete. For example, when signal-to-noise ratio (SNR) is sufficiently high, burst length is sufficiently long, etc., the frequency and/or phase offset of the burst transmission may be determined based on payload data symbols, and then used to help detect the UW symbols. Typically, because the detection is coherent, the UW symbols may be relatively short and the burst transmission efficiency may be relatively high. However, in environments exhibiting low signal-to-noise ratios or when the burst is short, starting with frequency detection may generate unreliable results. For example, Fourier transforms may generate "fake" peaks (e.g., where there are high noise frequency components), and as-yet-undetected UW symbols cannot be exploited to assist frequency detection. Subsequently, if the frequency detected is incorrect, in turn, the beginning of the transmission cannot be correctly identified.

Another technique for detecting transmission frequencies and UWs in burst transmissions is referred to as differential detection, in which the UW symbols are detected prior to obtaining a reliable frequency reference. Often, differential detection is used when frequency detection is difficult, for example, when signal-to-noise ratios are low for the burst transmission. Typically, the reliability of differential detection techniques depends on using relatively long UW symbols, which may reduce the bandwidth efficiency of the burst transmission.

Reliably recovering payload data from burst transmissions, then, may typically entail a trade-off between efficiency and reliability. Higher reliability in noisy environments may involve differential detection using long UW symbols. Therefore, burst transmission data recovery techniques that are both reliable and efficient may be beneficial in a range of satellite communications systems.

BRIEF SUMMARY

Systems, devices, processors, and methods are described which may be used for joint detection of frequency and unique word (UW) location for burst transmissions. In one set of embodiments, a wireless signal is received. Frequency detection is performed, resulting in multiple possible frequency correlation peaks. A subset of the correlation peaks are each used to perform trial frequency corrections, generating a set of trial sequences. A UW correlation is performed on each of the trial sequences (e.g., over some number of symbols-worth of uncertainty in the UW location) to generate a maximum UW correlation value for each trial sequence.

The UW correlation value and the frequency correlation peak value are weighted and combined to generate a joint detection correlation value. The trial sequence corresponding to the largest joint detection correlation value is assumed to indicate the correct transmission frequency and UW location. The jointly detected information may then be used to identify the frequency and start time of the burst transmission. The burst may then be demodulated, decoded, etc. to recover its payload data.

Notably, embodiments of joint detection techniques involve the use of various parameters, including a number of frequency correlation peaks, a number of symbols-worth of uncertainty in UW location, one or more weighting factors, etc. In various embodiments, some or all of these parameters are adjustable, or even adaptively adjustable, as a function of certain conditions. For example, in one embodiment, a signal-to-noise ratio is estimated, and the number of frequency correlation peaks is adaptively adjusted as a function of changes in the signal-to-noise ratio.

In one set of embodiments, a terminal is described for jointly detecting a frequency and UW for a wireless signal received via a satellite. The terminal may be a gateway, a user terminal (e.g., in a mesh network), or any other terminal that may receive a burst transmission. The terminal includes a frequency correction module configured to generate a set of trial sequences corresponding to each of a set of trial frequencies by frequency correcting the wireless signal as a function of each of the set of trial frequencies; a UW correlation module, communicatively coupled with the frequency correction module, and configured to calculate a UW correlation as a function of each trial sequence, each UW correlation having a respective UW location and UW correlation magnitude; and a weight-combining module, communicatively coupled with the frequency correction module and the UW correlation module, and configured to calculate a joint correlation magnitude for each of the set of trial frequencies as a function of a combination of the respective frequency correlation magnitude and the respective UW correlation magnitude.

In another set of embodiments, a method is provided for jointly detecting a frequency and UW for a wireless signal. The method includes receiving the wireless signal via a satellite; generating a set of trial sequences corresponding to each of a set of trial frequencies by frequency correcting the wireless signal as a function of each of the set of trial frequencies; calculating a UW correlation as a function of each trial sequence, each UW correlation having a respective UW location and UW correlation magnitude; and calculating a joint correlation magnitude for each of the set of trial frequencies as a function of the respective frequency correlation magnitude and the respective UW correlation magnitude for each of the set of trial frequencies. Calculating the joint correlation magnitude for each of the set of trial frequencies includes applying a weighting factor to at least one of the respective frequency correlation magnitude or the respective UW correlation magnitude.

In yet another set of embodiments, a system is provided for communicating a wireless signal. The system includes a gateway, configured to: generate a code block comprising a UW located at a UW location and a physical layer header identifying signaling information; and transmit the physical layer header and a set of data appended thereto as a wireless signal. The system further includes a terminal, in wireless communication with the gateway via a satellite, and configured to: generate a set of trial sequences corresponding to each of a set of trial frequencies by frequency correcting the wireless signal as a function of each of the set of trial frequencies; calculate a UW correlation as a function of each trial sequence, each UW correlation having a respective trial UW location and UW correlation magnitude; and calculate a joint correlation magnitude for each of the set of trial sequences, by applying a weighting factor to at least one of the respective frequency correlation magnitude or the respective UW correlation magnitude.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
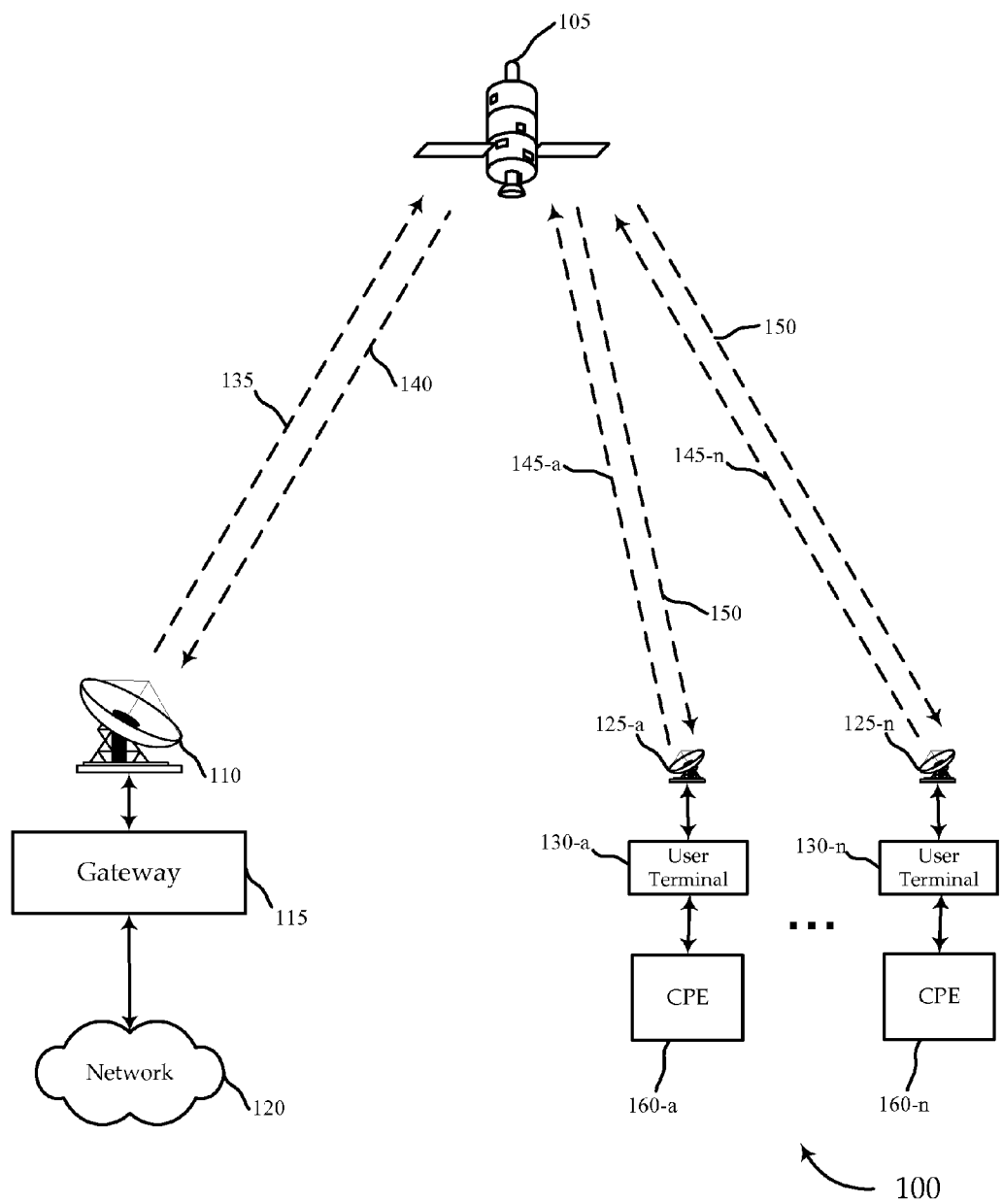
FIG. 1 is a block diagram of a satellite communications system configured according to various embodiments of the invention.

Systems, devices, and methods are described which may be used for joint detection of frequency and unique word (UW) location for burst transmissions. Frequency detection may be performed on a received wireless signal, resulting in multiple possible frequency correlation peaks. A subset of the correlation peaks are each used to perform trial frequency corrections, thereby generating a set of trial sequences. A UW correlation may be performed on each of the trial sequences (e.g., over some number of symbols-worth of uncertainty in the UW location) to generate a maximum UW correlation value for each trial sequence.

It will be appreciated that in a typical communications system having user terminals and gateways, burst transmissions may typically be sent from the user terminals to the gateways. However, in some cases, burst transmissions are sent from the gateway to user terminals, from user terminals to other user terminals (e.g., in a mesh network), etc. As such, the term "terminal" is used generally herein to describe any terminal-type of component configured to send and/or receive a burst transmission.

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following may individually or collectively be components of a larger system, wherein other procedures may take precedence over or otherwise modify their application. Also, a number of steps may be required before, after, or concurrently with the following embodiments.

As noted, some embodiments involve a novel method for joint detection of frequency and unique word (UW) location for burst transmissions. During frequency detection there may be multiple possible frequency correlation peaks. A subset of these peaks may each be used to perform trial frequency corrections, thereby generating a set of trial sequences. A UW correlation is performed on each of the trial sequences. As will be described in detail below, a UW correlation value and the frequency correlation peak value may be weighted and combined to generate a joint detection correlation value. The trial sequence corresponding to the largest joint detection correlation value is assumed to indicate the correct transmission frequency and UW location. The jointly detected information may then be used to identify the frequency and start time of the burst transmission. The burst may then be demodulated, decoded, etc. to recover its payload data.

Notably, embodiments of joint detection techniques involve the use of various parameters, including a number of frequency correlation peaks, a number of symbols-worth of uncertainty in UW location, one or more weighting factors, etc. In various embodiments, some or all of these parameters are adjustable, or even adaptively adjustable, as a function of certain conditions. For example, in one embodiment, a signal-to-noise ratio is monitored, and the number of frequency correlation peaks is adaptively adjusted as a function of changes in the signal-to-noise ratio.

Referring first to FIG. 1, a block diagram illustrates an example satellite communications system 100 configured according to various embodiments of the invention. While a satellite communications system is used to illustrate various aspects of the invention, it is worth noting that certain principles set forth herein are applicable to a number of other wireless systems, as well (e.g., other peer-to-peer wired or wireless links). The satellite communications system 100 includes a network 120, such as the Internet, interfaced with a gateway 115 that is configured to communicate with one or more user terminals 130, via a satellite 105. The physical layer frame synchronization and header processing techniques discussed herein may be used to process signals communicated over the satellite communications system 100 or another system. For example, user terminals 130 may send burst transmissions via the satellite 105 that are processed, using one or more of the techniques described herein, by the gateway 115.

It will be appreciated that, in a typical communications system having user terminals 130 and gateways 115, burst transmissions may typically be sent on the return link from user terminals 130 to gateways 115. However, in some cases, burst transmissions are sent from the gateway 115 to user terminals 130, from user terminals 130 to other user terminals 130 (e.g., in a mesh network), etc. As such, the term "terminal" is used herein to generally describe any terminal-type of component (e.g., including user terminals and gateways) configured to send and/or receive a burst transmission in any wireless communications system.

The network 120 may be any type of network and can include, for example, the Internet, an IP network, an intranet, a wide-area network (WAN), a local-area network (LAN), a virtual private network (VPN), the Public Switched Telephone Network (PSTN), or any other type of network supporting data communication between any devices described herein. A network 120 may include both wired and wireless connections, including optical links. Many other examples are possible and apparent to those skilled in the art in light of this disclosure. The network 120 may connect the gateway 115 with other gateways (not pictured), which are also in communication with the satellite 105, and which may share information on link conditions and other network metrics.

The gateway 115 provides an interface between the network 120 and the user terminal 130. The gateway 115 may be configured to receive data and information directed to one or more user terminals 130, and format the data and information (e.g., using CCM, ACM, or VCM) for delivery downstream to the respective user terminals 130 via the satellite 105. Similarly, the gateway 115 may be configured to receive upstream signals from the satellite 105 (e.g., from one or more user terminals 130) directed to a destination in the network 120, and can format the received signals for transmission through the network 120.

A device (not shown) connected to the network 120 may, therefore, communicate with one or more user terminals 130 through the gateway 115. Data and information, for example IP datagrams, may be sent from a device in the network 120 to the gateway 115. The gateway 115 may format a Medium Access Control (MAC) frame in accordance with a physical layer definition for transmission to the satellite 105 via a downstream link 135. A variety of physical layer transmission modulation and coding techniques may be used with certain embodiments of the invention, including those defined with the DVB-S2 and WiMAX standards. In a number of embodiments, the gateway 115 utilizes ACM in conjunction with one or more of the traffic control and shaping techniques described herein to direct traffic to the individual terminals. The gateway 115 may use a broadcast signal, with a modulation and coding format adapted for each packet to the link conditions of the user terminal 130 or set of user terminals 130 to which the packet is directed (e.g., to account for the variable service link 150 conditions from the satellite 105 to each respective user terminal 130).

The gateway 115 may use an antenna 110 to transmit the signal to the satellite 105. In one embodiment, the antenna 110 is a parabolic reflector with high directivity in the direction of the satellite and low directivity in other directions. The downstream signals 135, 150 may include, for example, one (or more) single carrier signals. Each single carrier signal may be divided in time (e.g., using TDMA or other time division multiplexing techniques) into a number of sub-channels. The sub-channels may be the same size, or different sizes, and a range of options will be addressed below. In some embodiments, other channelization schemes may be integrated with or used in place of time-divided sub-channels, such as Frequency Division Multiple Access (FDMA), Orthogonal Frequency Division Multiple Access (OFDMA), Code Division Multiple Access (CDMA), or any number of hybrid or other schemes known in the art.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception and/or transmission of signals. The satellite 105 may process the signals received from the gateway 115 and transmit the signal from the gateway 115 to one or more user terminals 130. In one embodiment, the satellite 105 operates in a multi-beam mode, transmitting a number of narrow beams each directed at a different region of the earth, allowing for frequency re-use. With such a multi-beam satellite 105, there may be any number of different signal switching configurations on the satellite, allowing signals from a single gateway 115 to be switched between different spot beams. In one embodiment, the satellite 105 may be configured as a "bent pipe" satellite, wherein the satellite may frequency-convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments, a number of configurations are possible (e.g., using LEO satellites, or using a mesh network instead of a star network), as evident to those skilled in the art.

The service signals transmitted from the satellite 105 may be received by one or more user terminals 130, via the respective user antenna 125. In one embodiment, the user antenna 125 and user terminal 130 together make up a very small aperture terminal (VSAT). In other embodiments, a variety of other types of user antennas 125 may be used at the user terminal 130 to receive the signal from the satellite 105. Each of the user terminals 130 may be a single user terminal or, alternatively, be a hub or router (not pictured) that is coupled with multiple user terminals. Each user terminal 130 may be connected to consumer premises equipment (CPE) 160 (e.g., computers, local area networks, Internet appliances, wireless networks, etc.).

In one embodiment, a Multi-Frequency Time-Division Multiple Access (MF-TDMA) scheme is used for upstream links 140, 145, allowing efficient streaming of traffic while maintaining flexibility in allocating capacity among each of the user terminals 130. In this embodiment, a number of frequency channels are allocated which may be fixed, or which may be allocated in a more dynamic fashion. A Time-Division Multiple-Access (TDMA) scheme is then employed in each frequency channel. In this scheme, each frequency channel may be divided into several timeslots that can be assigned to a connection (i.e., a user terminal 130). In other embodiments, one or more of the upstream links 140, 145 may be configured with other schemes, such as TDMA, FDMA, OFDMA, CDMA, or any number of hybrid or other schemes known in the art.

A user terminal 130 may transmit information related to signal quality to the gateway 115 via the satellite 105. The signal quality may be a measured signal-to-noise ratio, an estimated signal-to-noise ratio, a bit error rate, a received power level, or any other communication link quality indicator. The user terminal 130 itself may measure or estimate the signal quality, or it may pass information measured or estimated by other devices. A user terminal 130 may also transmit data and information to a network 120 destination via the satellite 105 and gateway 115. The user terminal 130 transmits the signals via the upstream uplink 145 to the satellite 105 using the antenna 125. A user terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different. The gateway 115 may, in some embodiments, use this signal quality information to implement ACM, adjusting the modulation and coding formats to each terminal or set of terminals based on their link conditions.

Figure 2A:
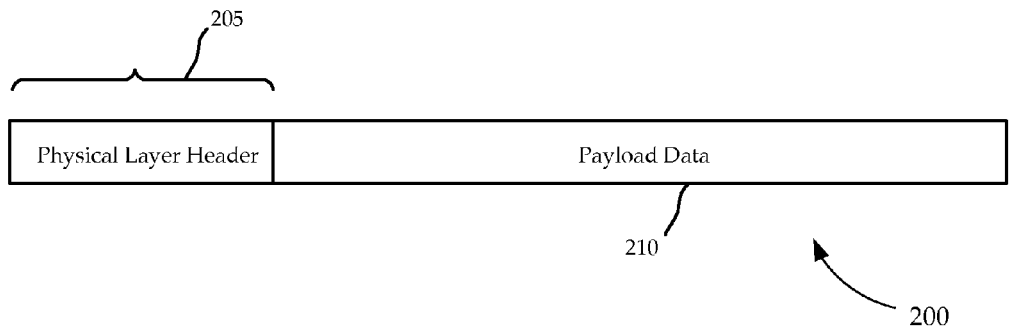
FIGS. 2A, 2B, and 2C are block diagrams illustrating example physical layer frame formats according to various embodiments of the invention.

When a gateway 115 has selected the applicable modulation and coding, it may encapsulate data received from the network to be transmitted via the satellite 105 to a user terminal 130. Similar types of modulation and coding, data encapsulation, physical layer frame formatting, etc. may be used on the return link (e.g., from the user terminal 130 to the gateway 115). FIG. 2A is a block diagram illustrating an example physical layer frame format 200 that may be used. A physical layer header 205 may be made up of encoded data including a sub-channel identifier and modulation and coding data. The payload data 210 may be the payload for the physical layer frame 200, and may be one or more IP packets, encapsulated in a Baseband frame which is FEC encoded and modulated (e.g., it may be, or be equivalent to, a FEC or XFEC frame under the DVB-S2 standard).

The modulation and coding data in the physical layer header 205 may identify the modulation and coding (e.g., the particular codeword sizes, code rates, modulation schemes, and pilot insertions) for encoded and modulated payload data 210 that is appended to the physical layer header 205. The physical layer header 205 (or parts thereof) may be protected by very low code rates so that it may be reliably received during excellent, or poor, SNR conditions. The encoded and modulated payload data 210, however, is in many embodiments adaptively coded on a per-terminal (or per-set of terminals) basis. By way of example, a user terminal 130 receiving a transmitted signal in a very low SNR environment may receive a frame 200 in which the encoded and modulated payload data 210 has been encoded at a very low code rate and using a more reliable modulation scheme Conversely, a user terminal 130 receiving a transmitted signal at a very high SNR may receive a physical layer frame 200 in which the encoded and modulated payload data 210 has been encoded at a very high code rate and at higher order modulation scheme.

In addition, physical layer header 205 may include a sub-channel identifier configured to identify different frames as belonging to particular sub-channels. By utilizing sub-channel identifiers in a physical layer header 205, receiving devices (e.g., the user terminals 130) may filter packets based on the sub-channel identifier without demodulating or decoding the payload data 210.

It is worth noting that descriptions herein that refer to "frames," "bursts," and other similar terms and phrases, will be understood by those of skill in the art to broadly include any similar type of communication technique. The purpose of a communication may typically be to transmit the payload data 210 from one node to another node. For example, data may be wirelessly transmitted from the user terminal 130 to the gateway 115 as a burst transmission in the satellite communications system 100 of FIG. 1. Embodiments of the physical layer header 205 are configured to aid in the recovery of the payload data 210. As such, the physical layer header 205 may be construed to represent any overhead to the transmission, regardless of its location in the transmission (i.e., some or all of the functionality may be implemented outside of the header itself, or the transmission may not even include a header). For example, various transmission protocols include pilot symbols (e.g., UWs) as part of a preamble, a post-amble, a mid-amble, a spread-amble, etc.

Figure 2B:
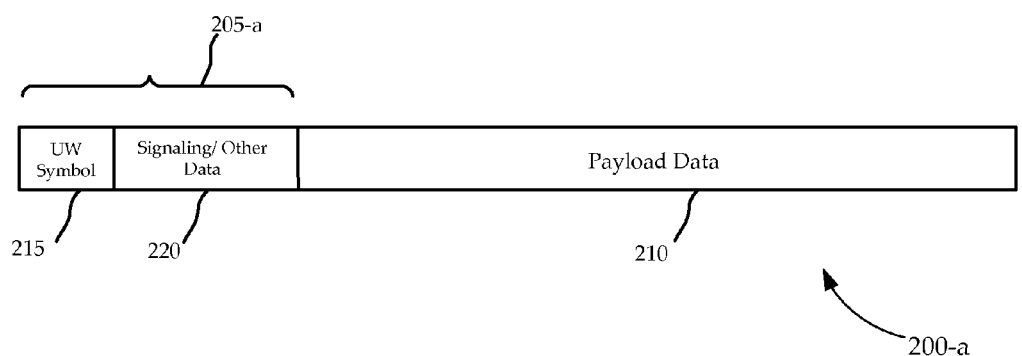

FIG. 2B illustrates an example embodiment of physical layer frame 200-a which may be an embodiment of the physical layer frame 200 of FIG. 2A. In the example, the physical layer header 205-a is a physical layer header at the start of each physical layer frame 200-a. The physical layer header 205-a includes signaling and/or other data 220 (e.g., as discussed above with reference to FIG. 2A), and one or more UW symbols 215. In some embodiments, the UW symbol 215 can be used to identify the start of each physical layer frame 200-a. For example, identification of the start of the physical layer frame 200-a may allow for identification of the start of the transmission, synchronization of incoming frames, and/or other functionality.

Figure 2C:
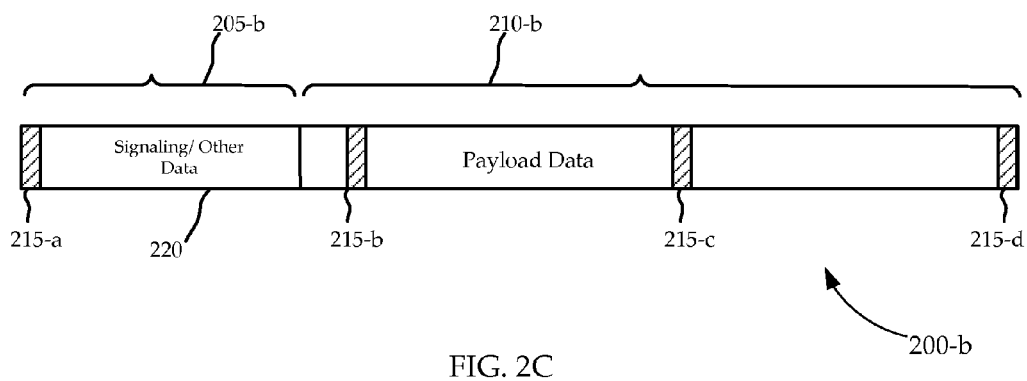

FIG. 2C illustrates another example embodiment of physical layer frame 200-b which may be an embodiment of the physical layer frame 200 of FIG. 2A. In the example, like in the physical layer frame 200-a of FIG. 2B, the physical layer frame 200-b includes a physical layer header 205-b at the start of each physical layer frame 200-b, and the physical layer header 205-b includes signaling and/or other data 220. The physical layer frame 200-b of FIG. 2C includes a number of UW symbols 215 spread throughout the physical layer frame 200-b (e.g., as a spread-amble). It will be appreciated that UW symbols 215 may be implemented as a spread-amble as dictated by a particular protocol and/or to provide certain functionality. For example, in some environments, mid-amble techniques may improve performance over preamble techniques.

Figure 3:
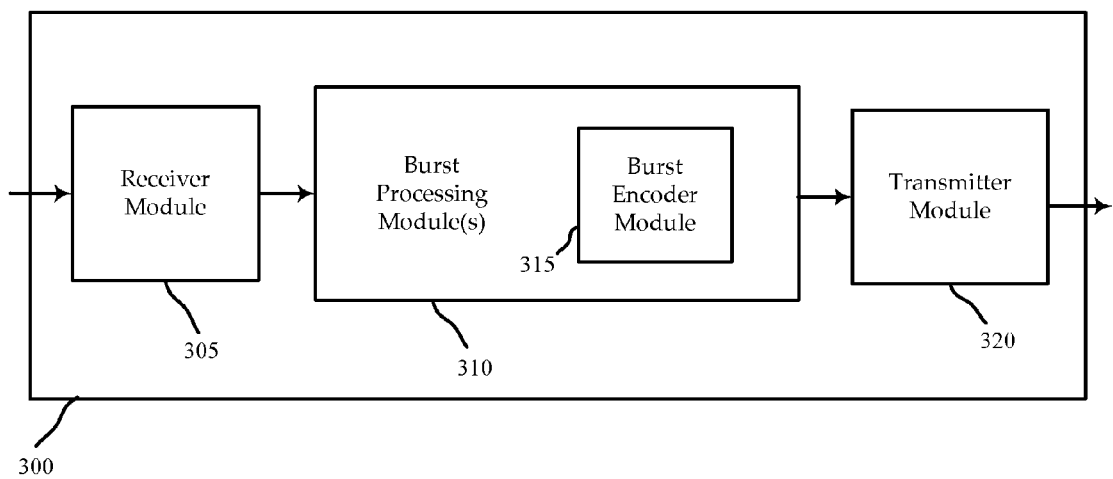
FIG. 3 is a block diagram of a terminal for a satellite communications system configured according to various embodiments of the invention.

Referring next to FIG. 3, an embodiment of a terminal 300 (e.g., a user terminal 130 of FIG. 1) is shown in block diagram form. In this embodiment, the receiving terminal 300 includes a receiver module 305, a burst processing module 310, and a transmitter module 320, each in communication with each other directly or indirectly. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors. Each module may include memory, or may access memory located elsewhere on or off the terminal 300.

The receiver module 305 may receive a set of data to be transmitted via a satellite 105 destined for another terminal (e.g., a gateway 115 or user terminal 130). This set of data may be received from a customer premises device to be transmitted via satellite 105 to a gateway 115. The burst processing module 310 may perform various types of processing to prepare the transmission for communication to the gateway 115. The burst processing module 310 may specify and generate the physical layer frame structure, and assemble each frame to prepare it for transmission. For example, the burst processing module 310 may prepare frames for transmission according to coding and modulation schemes, slot assignments, and other information, which may be dictated by (e.g., received from) the gateway 115.

In some embodiments, the burst processing module 310 includes one or more burst encoder modules 315. A burst encoder module 315 may be configured to encode the payload, for example, according to a physical layer frame structure, as described with reference to FIGS. 2A-2C. In some embodiments, a burst encoder module 315 may generate a code block making up all or part of a physical layer header. All or part of the code block of a physical layer header may include signaling information, identifying a sub-channel identifier and an assigned modulation and coding format. The code block may include one or more UW symbols, for example, formatted to be useable by a receiving gateway 115 or other receiving terminal to identify the start of frame. Thus, the physical layer header may correspond to the start of frame location. The transmitter module 320 may then transmit the encoded burst transmission (e.g., the physical layer frame described with reference to FIGS. 2A-2C).

Figure 4:
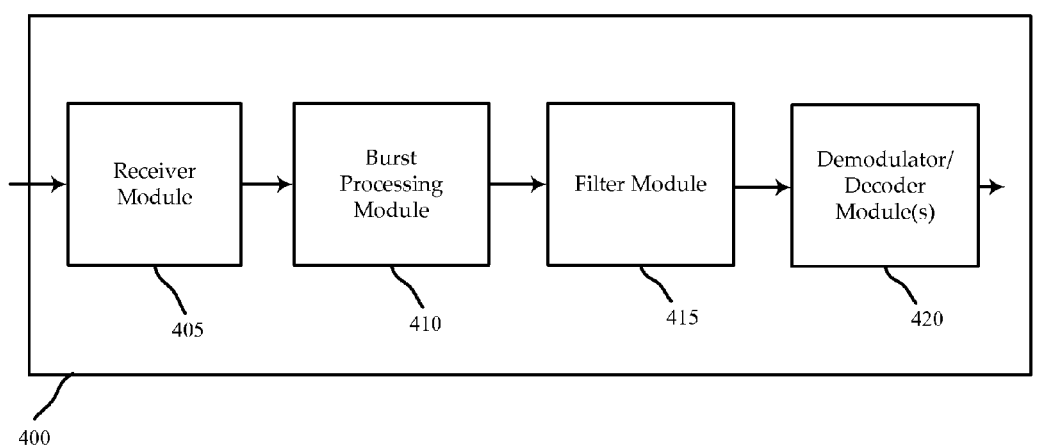
FIG. 4 is another block diagram of a terminal for a satellite communications system configured according to various embodiments of the invention.

Referring next to FIG. 4, a block diagram of another embodiment of a terminal 400 (e.g., the gateway 115 of FIG. 1) is shown, according to various embodiments. In this embodiment, the terminal 400 includes a receiver module 405, a burst processing module 410, a filter module 415, and a demodulator/decoder module(s) 420, each in communication with each other directly or indirectly. These modules of the device may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used, which may be programmed in any manner known in the art. The functions of each module may also be implemented, in whole or in part, with instructions embodied in a memory, formatted to be executed by one or more general or application-specific processors. Each module may include memory, or may access memory located elsewhere on or off the terminal 400.

The receiver module 405 may be configured to receive a wireless signal transmitted via a satellite. This may, for example, be the signal transmitted from a user terminal 130 through the satellite 105 as described with reference to FIG. 1, and received via the gateway 115. The receiver module 405 may downconvert and digitize the signal (e.g., using an integrated or separate A/D converter, not shown). In digitizing the received signal, the receiver module 405 may continue to perform symbol timing recovery. In addition, the receiver module 405 may perform coarse frequency rotation and provide matched filtering functions (note that receiver module 405 may perform the joint frequency and unique word detection described in more detail below, and/or this functionality may be performed by the burst processing module 410). The digitized signal may be forwarded by the receiver module 405 to the burst processing module 410. The burst processing module 410 may, therefore, receive a digitized physical layer signal made up of a series of symbols representative of the received wireless signal. This digitized stream may be made up of in-phase and quadrature components.

The burst processing module 410 may process the digitized stream to detect a start of frame (e.g., physical layer frame 200 for FIG. 2A, 2B, or 2C) location. The burst processing module 410 may correlate different portions of the digitized stream to generate a number of correlation values, utilizing the correlation values to locate one or more correlation peaks and thereby identify the start of frame location. For example, the burst processing module 410 may search the digitized stream to identify pilot symbols (e.g., the UW symbols 215 of FIGS. 2B and 2C) in the physical layer header 205 corresponding to the start of frame location. The burst processing module 410 may then demodulate and decode a physical layer header (e.g., physical layer header 205 for FIG. 2A, 2B, or 2C) to identify a signaling information and a sub-channel identifier for a physical layer payload (e.g., physical layer payload 210 for FIG. 2A, 2B, or 2C) associated therewith. Thus, a physical layer header 205 may serve multiple functions, as it may be formatted for use in frame synchronization and also include signaling information. It is, however, worth noting that the signaling information and/or other information may also be included in other portions of the frame (e.g., using a spread-amble or post amble). The burst processing module 410 may, therefore, perform a variety of processing functions to obtain the signaling information and or other information before forwarding the payload for demodulation and decoding.

The filter module(s) 415 may be configured to store one or more sub-channel identifiers (for example, sub-channel identifiers such as those in the physical layer header 205 in FIG. 2A, 2B, or 2C), the stored sub-channel identifiers indicating whether physical layer payload associated with the particular sub-channel identifier is to be demodulated and decoded by the terminal 400. The filter module 415 may forward the physical layer payload to the demodulator/decoder module(s) 420. The filter module 415 and the demodulator/decoder module(s) 420 need not be included in some embodiments. In some embodiments, the filter module 415 is functionally implemented on the other side of the demodulator/decoder module(s) 420. For example, filtering is performed after demodulating and/or decoding.

It will be appreciated that the receiver module 405 may not readily be able to frequency correct the received wireless signal to synchronize the transmission for reliable payload recovery. Various techniques for frame synchronization are possible, and the techniques typically involve detecting carrier frequency and UW symbols in sequence (e.g., one after the other). One known technique for detecting UWs in burst transmissions may be referred to as coherent detection, in which the UW symbols are detected only after frequency detection is complete. For example, when signal-to-noise ratio (SNR) is sufficiently high, burst length is sufficiently long, etc., the frequency and/or phase offset of the burst transmission may be determined based on payload data symbols, and then used to help detect the UW symbols.

Typically, because the detection is coherent, the UW symbols may be relatively short and the burst transmission efficiency may be relatively high. However, in environments exhibiting low signal-to-noise ratios or when the burst is short, starting with frequency detection may generate unreliable results. For example, Fourier transforms may generate "fake" peaks (e.g., where there are high noise frequency components), and as-yet-undetected UW symbols cannot be exploited to assist frequency detection. Subsequently, if the frequency detected is incorrect, in turn, the beginning of the transmission cannot be correctly identified.

Another known technique for detecting transmission frequencies and UWs in burst transmissions may be referred to as differential detection, in which the UW symbols are detected prior to obtaining a reliable frequency reference.

Differential detection may be used when frequency detection is difficult, for example, when signal-to-noise ratios are low for the burst transmission. Typically, the reliability of differential detection techniques depends on using relatively long UW symbols, which may reduce the bandwidth efficiency of the burst transmission.

Embodiments of the burst processing module 410 may perform additional processing to implement joint detection of the frequency and UW location(s). For example, rather than using coherent or differential detection, joint detection may allow for reliable recovery of payload data using relatively short pilot symbols, even in relatively high-noise and/or short burst environments. Embodiments of joint detection techniques detect frequency and UW substantially jointly, as described more fully with respect to FIGS. 5-8. It will be appreciated that, while the joint detection is described as being performed by the receiver module 405, the joint detection may be implemented in the burst processing module 410 or in any other useful location. Further, as discussed above, the joint detection is described as being performed in terminal 400, which could be a user terminal 130, a gateway 115, and/or any other receiver of burst transmissions, depending, for example, on the particular topology of the communications system (e.g., satellite communications system 100) and/or on other factors. For example, in various embodiments, the joint detection functionality is implemented by a joint detection module located within, implemented as part of, or in operative communication with, another component of the satellite communications system 100.

Figure 5:
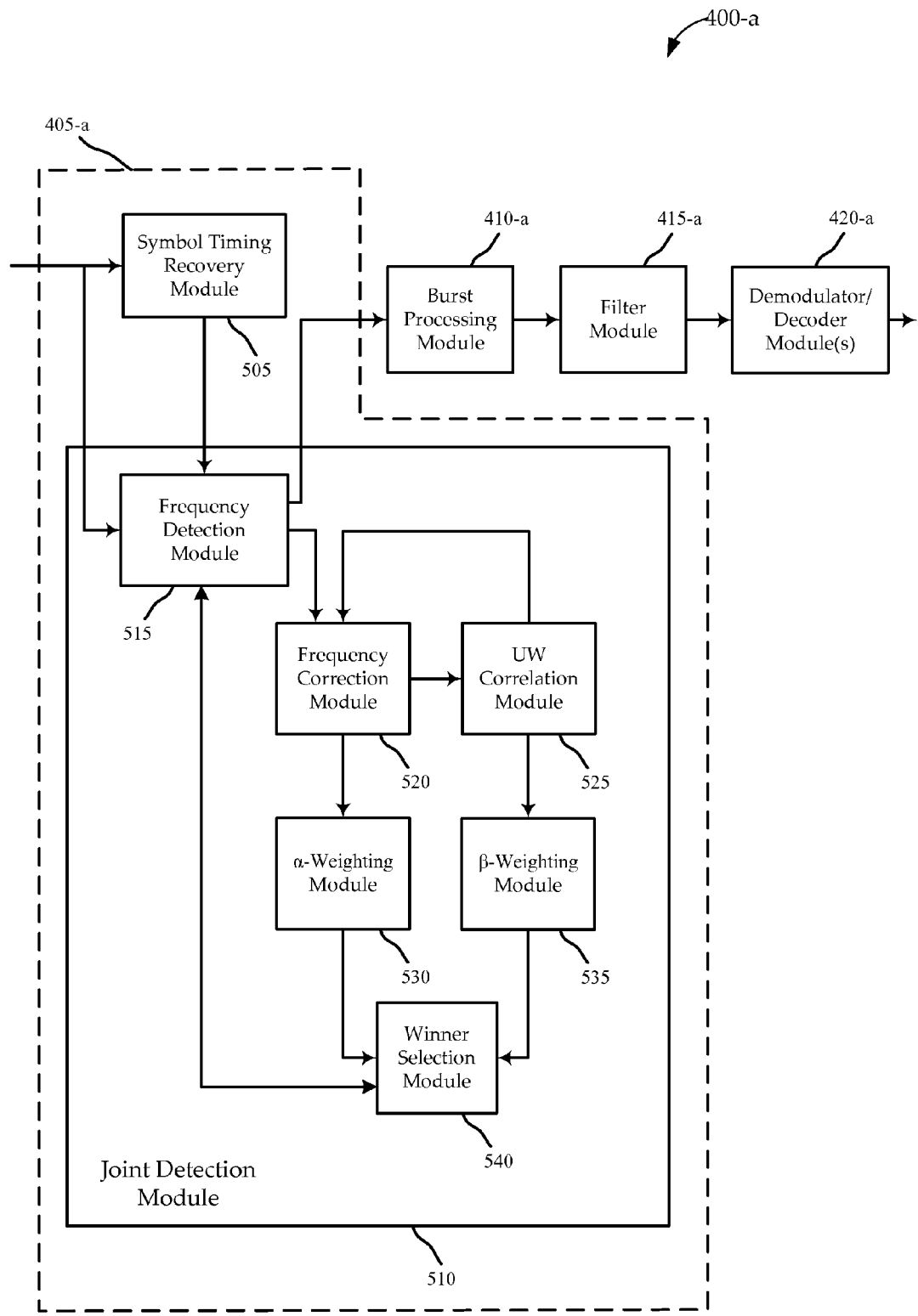
FIG. 5 shows a block diagram illustrating an embodiment of a terminal, including a joint detection module, according to various embodiments.
Figure 6:
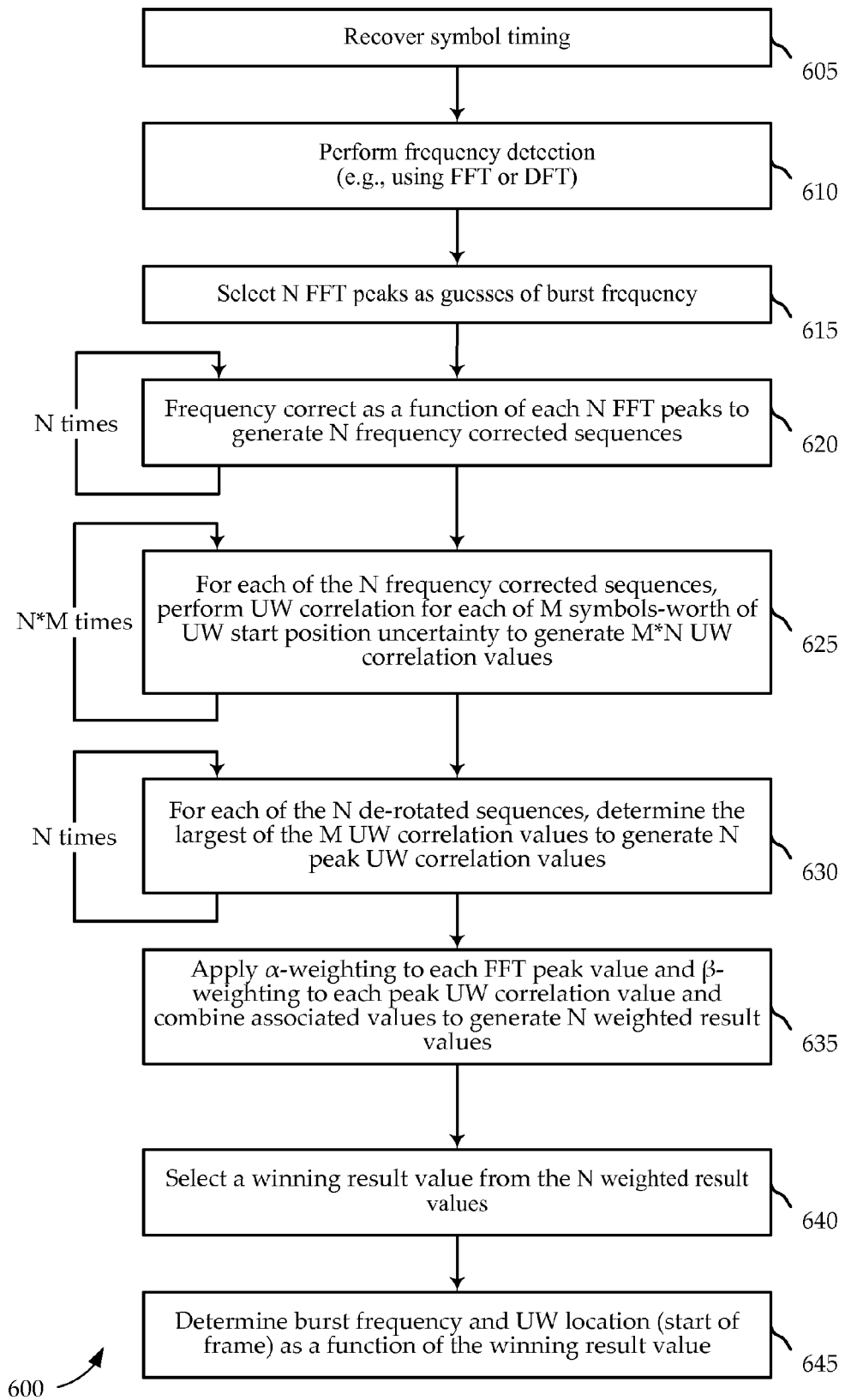
FIG. 6 shows a flow diagram illustrating an embodiment of a method for implementing joint detection, according to various embodiments.

FIG. 5 shows a block diagram illustrating an embodiment of a terminal 400-a (e.g., an embodiment of the terminal 400 of FIG. 4), including a joint detection module 510, according to various embodiments. FIG. 6 shows a flow diagram illustrating an embodiment of a method for implementing joint detection, according to various embodiments. For the sake of clarity, FIGS. 5 and 6 will be described in parallel. It is worth noting, however, that the system of FIG. 5 may be used to implement embodiments of methods other than those illustrated by FIG. 6, and the method of FIG. 6 may be implemented on systems other than those illustrated by FIG. 5. As such, the parallel description of the figures should not be construed as limiting the scope of the embodiments in any way.

According to FIG. 5, the joint detection module 510 is shown implemented within the receiver module 405-a of the terminal 400-a, and the receiver module 405-a is in communication with a burst processing module 410-a, a filter module 415-a, and/or demodulator/decoder module(s) 420-a. As shown in FIG. 6, embodiments of the method 600 begin at block 605 by recovering symbol timing. In some embodiments, the joint detection module 510 is communicatively coupled with a symbol timing recovery module 505. Embodiments of the symbol timing recovery module 505 implement one or more techniques for recovering symbol timing (e.g., at block 605) from the burst transmission substantially as it is received at the receiver module 405-a. It will be appreciated that techniques are known in the art for recovering symbol timing at block 605—knowing the start and stop times of individual symbols in the burst—even when the frequency and/or UW location(s) for the burst transmission are as-yet-unknown.

After symbol timing is recovered at block 605, frequency detection techniques may be applied to the recovered symbol sequence at block 610. Embodiments of the joint detection module 510 include a frequency detection module 515 for detecting the frequency of the burst transmission using one or more techniques at block 610. For example, a burst sequence (e.g., a sequence of symbols) may be received from the symbol timing recovery module 505. A fast Fourier transform (FFT) or a discrete Fourier transform (DFT) may be applied to the burst sequence by the frequency detection module 515, resulting in a number of frequency correlation peaks (e.g., or, typically, the transform is applied to the sequence after modulation has been removed, for example by applying an "N-theta" operation). Other techniques may be used in other embodiments for generating frequency correlation peaks.

Each frequency correlation peak may have an associated peak frequency and peak magnitude. Notably, where there is noise in the burst transmission, there may be a peak at the correct transmission frequency and additional peaks at various noise frequencies, each having a substantial magnitude. Further, in some cases (e.g., where there is a low signal-to-noise ratio), the peak magnitude of one or more of the noise frequencies may be greater than the peak magnitude at the actual transmission frequency. As such, a typical (e.g., coherent) detection technique may incorrectly detect the transmission frequency as a noise frequency having a magnitude greater than that of the correct transmission frequency.

Instead of selecting one peak (e.g., the peak having the highest magnitude), embodiments of the frequency detection module 515 select multiple peaks at block 615 to pass to the frequency correction module 520. The number of peaks may be selected at block 615 to produce a burst recovery error less than some threshold level. For example, in a 1024-bin FFT, thirty-two peaks may be selected to produce a burst recover error rate below 0.001% ("1e–5") at a signal-to-noise ratio of 2.5 decibels. The number of peaks selected at block 615 will be referred to herein as "N." Of course, N may be selected to maximize the chance of selecting the correct transmission frequency, while minimizing the number of possible frequencies to be tested. As such, N could theoretically be equal to the total number of peaks (e.g., frequency bins of the transform). The value of N may be programmed into the receiver as a function of one or more simulations or other techniques, as described more fully below with reference to FIG. 7.

In some embodiments, the number of peaks selected at block 615 is adaptively adjusted as a function of certain link conditions of the transmission. For example, as the noise level (e.g., signal-to-noise ratio) of the transmission decreases, more peaks may be selected to improve the recovery performance. The number of peaks selected may be adaptively adjusted in a number of ways. For example, the number may be adjusted by one or some other increment, as a function of a look-up table, or based on some other formula. In one embodiment, the transmission link between the gateway 115 and the user terminal 130 is monitored to estimate noise level or perform other signal quality measurements, and N is adapted accordingly (e.g., increasing N as quality deteriorates). In another embodiment, test transmissions with known parameters are communicated over the transmission link to aid in estimating parameters of the link condition. While dynamic adjustment of N may not be cost effective in many embodiments, certain advantages may be gained, for example, where power management is a critical factor.

At block 620, each of the N selected peaks may be used to frequency correct the burst sequence. For example, the frequencies associated with the selected peaks may be communicated to the frequency correction module 520. Embodiments of the frequency correction module 520 frequency correct the burst sequence as a function of each selected peak frequency. As there are N selected peaks, there may be N frequency-corrected sequences, or "trial sequences." As such, as shown in FIG. 6, block 620 of the method 600 may be repeated N times to generate the N trial sequences. It will be appreciated that N is selected such that there is a high probability that one of the trial sequences was produced as a function of the actual received frequency, and is, therefore, the correctly de-rotated sequence. It is worth noting that the transform (e.g., FFT) window may be determined as a function of a presumed or detected frame size of the burst. As such, it may be important for the timing error and/or timing offset to be small enough such that a sufficient amount of the burst is included in the transform window for reliable frequency detection.

For each of the N trial sequences, a UW correlation may be performed at block 625. For example, each trial sequence may then be passed to the UW correlation module 525, which may implement a UW correlation on each trial sequence at block 625. In some embodiments, there is some amount of uncertainty as to the location of the UW symbol in the burst transmission. The uncertainty may be measured by some number of symbols-worth of uncertainty, referred to herein as "M." For each trial sequence, then, the UW correlation may be implemented over the M symbols-worth of UW location uncertainty, resulting in M*N UW correlations to be performed by the UW correlation module 525. It is worth noting that the method 600 shows block 625 iterating M*N times. It will be appreciated that M and/or N may be selected at least partially as a function of the processing capabilities (e.g., speed) of the UW correlation module 525. Further, M may be adaptively adjusted in certain embodiments in a similar or different way from that discussed with reference to N.

As a result of performing M*N UW correlations, a set of UW correlation peaks may be generated, each having an associated UW location prediction and peak magnitude. There may thus be N selected frequency correlation peaks having N frequency peak magnitudes, and M*N UW correlation peaks having M*N UW peak magnitudes. In some embodiments, the magnitudes relate to entirely different units, magnitudes, etc. In other embodiments, the magnitudes may be correlated, normalized, corrected, etc. For example, as shown in block 635 of the method 600, an α-weighting may be applied to each frequency peak magnitude and/or a β-weighting may be applied to each UW peak magnitude. These values may then be combined to generate N weighted result values.

For example, in some embodiments, the frequency peak magnitudes are passed to an α-weighting module 530, where an α-weighting factor is applied. Alternatively or additionally, in some embodiments, the UW peak magnitudes are passed to a β-weighting module 535, where a β-weighting factor is applied. The α-weighting factor and/or the β-weighting factor may be predetermined as a function of some simulation to achieve a certain threshold level of recovery reliability, as described more fully below with reference to FIG. 8. In certain embodiments, the α-weighting factor and/or the β-weighting factor are adaptively adjusted as a function of changes in noise level or other link conditions over time. For example, the weighting factors may be adjusted incrementally, as a function of a look-up table, etc. In certain embodiments, some or all of α, β, and N are adjusted together according to some optimization technique. For example, a look up table may be provided having associative relationships between certain signal-to-noise ratios and values of α, β, and N.

Notably, in one embodiment, one or more of the weighting factors are applied to normalize the peak magnitudes. For example, the UW peak magnitudes may be multiplied by a β-weighting factor to effectively be normalized to values similar to the frequency peak magnitudes. In another embodiment, one or more of the weighting factors are applied as a function of optimizing payload recovery (e.g., minimizing error).

In some embodiments, the N weighted (or un-weighted) frequency correlation magnitudes are combined with their respective N*M weighted (or un-weighted) UW correlation magnitudes to generate some number of candidate joint correlation values. In one embodiment, all N*M UW correlation peaks are used in the combination, such that N*M candidate joint correlation values are generated. In another embodiment, a UW correlation value is selected for each of the respective N trial sequences prior to the combination, such that N candidate joint correlation values are generated. For example, as shown in block 630 of the method 600, the largest of the M UW peak magnitudes may be selected for each of the N trial sequences, resulting in N peak UW correlation values. Those N greatest-magnitude UW peaks may then be used to generate N candidate joint correlation values.

After candidate joint correlation values are generated, a winner may be selected according to some algorithm in block 640 of the method 600. For example, the candidate joint correlation values may be communicated to the winner selection module 540, which may be configured to select a winner. In one embodiment, the highest candidate joint correlation value is selected as the winner. It will be appreciated that each joint correlation value is associated with a particular frequency (e.g., the frequency associated with the selected frequency correlation peak used to generate the frequency peak magnitude used to generate the joint correlation value) and a particular UW location (e.g., the UW location associated with the selected UW correlation peak used to generate the UW peak magnitude used to generate the joint correlation value). In some embodiments, the winning joint correlation value is passed back to the frequency detection module 515, where the respective frequency and UW location are used to recover the burst timing and remove the residual frequency error. For example, in block 645 of the method 600, once the sequence is properly frequency corrected and the UW location is known, the beginning and end of the burst (e.g., the frame) may be reliably identified. Reliable burst timing recovery may then allow the payload data in the burst to be reliably recovered by other components of the terminal 400-a, like the burst processing module 410-a, the filter module 415-a, and/or demodulator/decoder module(s) 420-a.

It will be appreciated that modifications to the weighting and combining techniques may be implemented according to various embodiments. For example, in some embodiments, a second frequency detection is performed. After the UW location is determined for each trial sequence, the UW pattern may be removed from the trial sequence, and a preamble-based frequency detection technique (e.g., an FFT) may be applied. For example, preamble-based techniques may be "1-theta" techniques, which may be less noisy than other "N-theta" techniques. The output of the preamble-based frequency detection may then be weight-combined (e.g., using a third weighting factor, using the α-weighting factor, etc.) with the respective frequency correlation peak and the respective UW correlation peak for the trial sequence. This additional weight-combining may effectively exacerbate the differences between the joint correlation associated with the correct transmission frequency and the joint correlation associated with incorrect transmission frequencies. As such, the error rate in selecting a winner may be further reduced.

In some embodiments, as described above, one or more parameters of embodiments of joint detection techniques may be predetermined or dynamically adjusted. For example, the joint detection result may depend, at least in part, on factors, including the number of frequency correlation peaks selected from the frequency detection results (e.g., N), the number of symbols-worth of uncertainty in the UW start location (e.g., M), the α-weighting factor, the β-weighting factor, etc. In some embodiments, some or all of these parameters are determined by embodiments of methods described in FIGS. 7 and 8.

Figure 7:
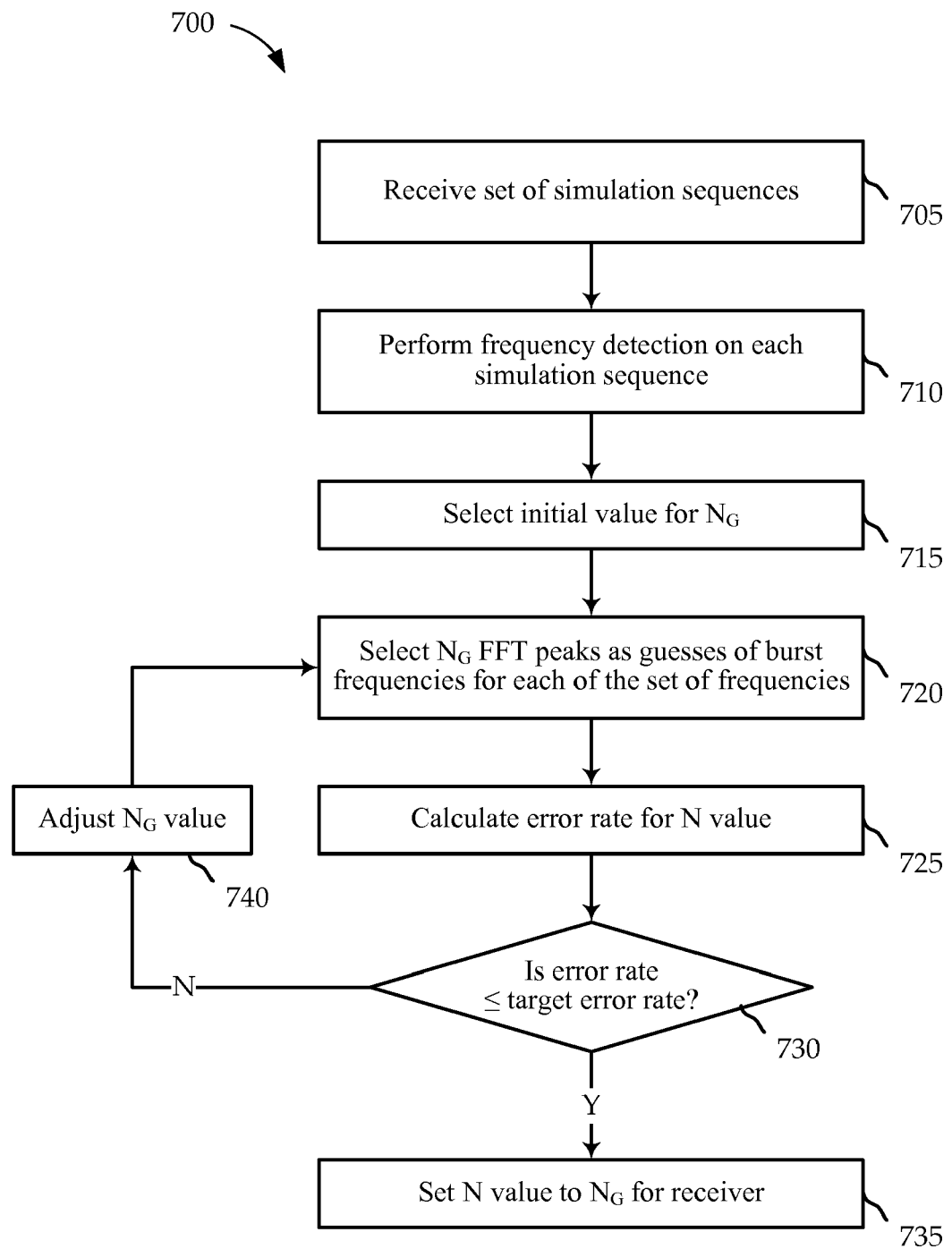
FIG. 7 shows a flow diagram that illustrates an embodiment of a method for determining N, number of frequency correlation peaks selected from the frequency detection results, according to various embodiments.

FIG. 7 shows a flow diagram that illustrates an embodiment of a method 700 for determining N, number of frequency correlation peaks selected from the frequency detection results, according to various embodiments. The method 700 begins at block 705 by receiving a set of simulation sequences. For example, the set of simulation sequences may be received by a simulator (e.g., which may, but need not, be implemented as part of the receiver module 405 of terminal 400 of FIG. 4). In one embodiment, the simulator is configured to simulate a changing operational environment for a receiver. For example, a series of simulated frames are received by the simulator over a simulated satellite link having simulated changes in link conditions. The simulated changes in link conditions may simulate effects of changes in carrier frequency error, satellite altitude, weather patterns, signal interference, etc. Of course, any useful types of simulation are possible, according to various embodiments.

At block 710, a frequency detection is performed on each simulation sequence. For example, an FFT or DFT is applied to each simulation sequence at block 710. As described above, this frequency detection may result in a number of frequency peaks being generated (e.g., as a function of the number of bins of the transform). The method 700 may then begin to iteratively guess at the optimal value for N, where each guess is referred to as $N_G$.

An initial guess is used at block 715 as the value for $N_G$. In some embodiments, the initial $N_G$ value is a predetermined initial value used for simulations. In other embodiments, the initial $N_G$ value is the current value of N. For example, if a receiver is currently selecting 32 peaks, and a monitored noise level of the received signal changes, the receiver may run a new simulation according to the method 700 to re-optimize N, wherein the current N-value of 32 is used as the initial $N_G$ value.

At block 720, $N_G$ frequency correlation peaks are selected as guesses of the correct burst frequency for each of the set of received frequencies. The $N_G$ frequency correlation peaks are then used at block 725 to calculate an error rate for the $N_G$ value chosen. For example, the $N_G$ peaks are used in a joint detection method, like the method 600 of FIG. 6 to determine the burst transmission frequency. This determined frequency may be compared against the known burst transmission frequency to determine the frequency detection error.

At block 730, the resulting frequency detection error is compared against a threshold frequency detection error to determine whether the actual error rate is less than or equal to the target error rate. If the resulting frequency detection error is greater than the target frequency detection error, a new value for $N_G$ is selected at block 740 (e.g., typically, the value may be increased). If the resulting frequency detection error is less than or equal to the target frequency detection error, the $N_G$ value may be set as the N value for the receiver at block 735. In some embodiments, if the resulting frequency detection error is less than or equal to the target frequency detection error, a new $N_G$ value may be selected. For example, it may be possible to lower the value of N and keep the actual error rate below the target rate, while reducing the processing load on the receiver. In some embodiments, when a new $N_G$ value is selected (e.g., at block 740), the method 700 iterates through blocks 720, 725, and 730 until a desired value is found for use as N for the receiver.

In some embodiments, multiple simulations are run to simulate different noise levels and/or other conditions. The multiple simulations may yield values of N corresponding to various conditions. These corresponding values may then be stored associatively in a look-up table, or using a similar technique. Similarly, the simulations may be used to analyze how types of changes in N (e.g., direction of change, magnitude of change, change with respect to other parameters, etc.) affect the error rate. As described above, the look-up tables, change analyses, etc. may be used in the receiver to aid in adaptively changing the value of N as actual operational conditions change.

Figure 8:
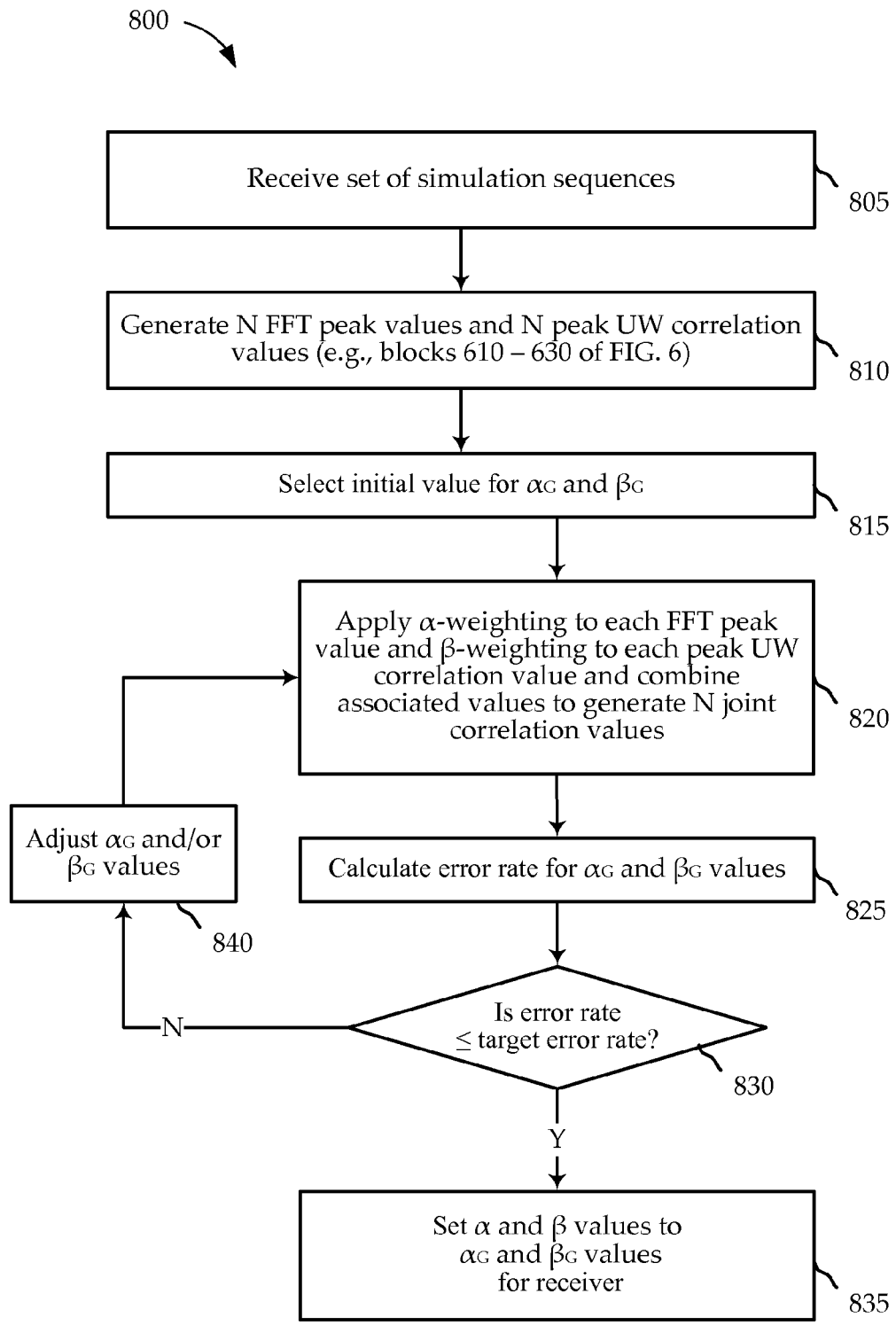
FIG. 8 shows a flow diagram that illustrates an embodiment of a method for determining α and β, for use as the α-weighting factor and the β-weighting factor in embodiments of joint detection techniques, respectively, according to various embodiments.

Similar techniques may be used to determine and/or adaptively adjust other parameters of embodiments of joint detection techniques. FIG. 8 shows a flow diagram that illustrates an embodiment of a method 800 for determining α and β, for use as the α-weighting factor and the β-weighting factor in embodiments of joint detection techniques, respectively, according to various embodiments. The method 800 begins at block 805 by receiving a set of simulation sequences. For example, as in the method 700 of FIG. 7, the set of simulation sequences may be received by a simulator, or by receiver module 405 of terminal 400 of FIG. 4. At block 810, N frequency correlation peaks and N (e.g., or N*M) UW correlation peaks are generated. In some embodiments, these peaks are generated by an embodiment of the method 600 of FIG. 6 and/or by the terminal 400-a of FIG. 5.

The method 800 may then begin to iteratively guess at the optimal values for α and β, where each guess is referred to as $\alpha_G$ and $\beta_G$, respectively. At block 815, initial values for $\alpha_G$ and $\beta_G$ are selected. In some embodiments, the initial $\alpha_G$ and $\beta_G$ values are predetermined initial values used for simulations. In other embodiments, the initial $\alpha_G$ and $\beta_G$ values are the current values of $\alpha_G$ and $\beta_G$ (e.g., for the receiver). The values are used at block 820 to apply α-weighting to each frequency correlation peak and/or to apply β-weighting to each UW correlation peak and to combine the resulting weighted values to generate N joint correlation values (e.g., or N*M joint correlation values, as described above).

An error rate may then be calculated at block 825 for the selected $\alpha_G$ and $\beta_G$ values. In some embodiments, the error rate is calculated by using the joint correlation values to select a winning burst sequence, as described above with reference to FIG. 6. The winning burst sequence is then used to determine a transmission frequency and/or unique word location. The determined transmission frequency and/or unique word location is then compared against the known transmission frequency and/or unique word location to generate an error rate.

At block 830, the determined error rate is compared against a target error rate to determine whether the determined error rate is less than or equal to the target error rate. If the determined error rate is greater than the target error rate, new values for $\alpha_G$ and $\beta_G$ are selected at block 840. If the determined error rate is less than or equal to the target error rate, the $\alpha_G$ and $\beta_G$ values may be set as the α and β values for the receiver, respectively, at block 835. In some embodiments, if the determined error rate is less than or equal to the target error rate, new $\alpha_G$ and $\beta_G$ values may be selected. For example, it may be possible to adjust the values such that only one weighting factor is used, which may reduce the processing load on the receiver. In some embodiments, when new $\alpha_G$ and $\beta_G$ values are selected (e.g., at block 840), the method 800 iterates through blocks 820, 825, and 830 until desired values are found for use as α and β for the receiver.

In some embodiments, as with embodiments of the method 700 of FIG. 7, multiple simulations are run to simulate different noise levels and/or other conditions. The multiple simulations may yield values of α and/or β corresponding to various conditions. These corresponding values may then be stored associatively in a look-up table, or using a similar technique. Similarly, the simulations may be used to analyze how types of changes in α and/or β (e.g., direction of change, magnitude of change, change with respect to other parameters, etc.) affect the error rate. As described above, the look-up tables, change analyses, etc. may be used in the receiver to aid in adaptively changing the value of N as actual operational conditions change.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory module" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A terminal to jointly detect a frequency and unique word for a wireless signal received via a satellite, the terminal comprising:
   a frequency correction module configured to generate a set of trial sequences, each trial sequence comprising a sequence of symbols generated by frequency correcting the wireless signal as a function of each of a set of trial frequencies;
   a unique word correlation module, communicatively coupled with the frequency correction module, and configured to calculate a unique word correlation as a function of each trial sequence, each unique word correlation having a respective unique word location and unique word correlation magnitude; and
   a weight-combining module, communicatively coupled with the frequency correction module and the unique word correlation module, and configured to calculate a joint correlation magnitude for each of the set of trial frequencies as a function of a combination of the respective frequency correlation magnitude and the respective unique word correlation magnitude.

2. The terminal of claim 1, wherein the unique word location is configured to be used to identify a start location for a frame of the wireless signal.

3. The terminal of claim 1, further comprising:
   a demodulator module, communicatively coupled with the weight-combining module, and configured to demodulate the wireless signal as a function of an optimal transmission frequency and an optimal unique word location, wherein:
      the frequency correction module is further configured to determine the optimal transmission frequency being the transmission frequency associated with the trial sequence having the greatest respective joint correlation magnitude; and
      the unique word correlation module is further configured to determine the optimal unique word location being the unique word location associated with the trial sequence having the greatest respective joint correlation magnitude.

4. The terminal of claim 1, wherein the frequency correction module is configured to calculate the set of trial frequencies by:
   calculating a plurality of frequency correlation values as a function of the wireless signal, each of the plurality of frequency correlation values having a respective transmission frequency and a respective frequency correlation magnitude; and
   selecting a number of the plurality of frequency correlation values as the set of trial frequencies, each of the set of trial frequencies having a respective transmission frequency and frequency correlation magnitude.

5. The terminal of claim 4, wherein calculating the plurality of frequency correlation values comprises applying at least one of a fast Fourier transform or a discrete Fourier transform to the wireless signal.

6. The terminal of claim 4, wherein selecting the number of the plurality of frequency correlation values as the set of trial frequencies comprises selecting the number of the plurality of frequency correlation values having the greatest respective frequency correlation magnitudes.

7. The terminal of claim 4, wherein the weight-combining module is further configured to:
estimate a noise level of the wireless signal; and
adaptively adjust the number of the plurality of frequency correlation values as a function of the noise level.

8. The terminal of claim 1, wherein the frequency correction module is configured to frequency correct the wireless signal as a function of each of the set of trial frequencies by de-rotating the wireless signal as a function of each of the set of trial frequencies.

9. The terminal of claim 1, wherein the unique word correlation module is configured to calculate the unique word correlation for each trial sequence, by:
calculating a trial unique word magnitude by correlating a predetermined unique word with the trial sequence at each of a number of trial unique word locations; and
determining the unique word correlation for the trial sequence by associating the trial sequence with the one of the number of trial unique word locations calculated to have the greatest trial unique word magnitude.

10. The terminal of claim 9, wherein:
each of the number of trial unique word locations corresponds to a possible start symbol location for the predetermined unique word; and
the number of trial unique word locations is determined as a function of a number of symbols-worth of uncertainty in the possible start symbol location for the predetermined unique word.

11. The terminal of claim 1, wherein the weight-combining module is configured to calculate the joint correlation magnitude for each of the set of trial sequences, by:
applying a weighting factor to at least one of the respective frequency correlation magnitude or the respective unique word correlation magnitude to generate an adjusted frequency correlation magnitude and an adjusted unique word correlation magnitude, respectively; and
adding the adjusted frequency correlation magnitude to the adjusted unique word correlation magnitude to generate the joint correlation magnitude.

12. The terminal of claim 11, wherein the weight-combining module is further configured to:
estimate a noise level of the wireless signal; and
adaptively adjust the weighting factor as a function of the noise level.

13. The terminal of claim 1, further comprising:
a symbol timing recovery module configured to generate a burst sequence by recovering a symbol timing of the wireless signal,
wherein the frequency correction module is configured to generate the set of trial sequences corresponding to each of a set of trial frequencies by frequency correcting the burst sequence as a function of each of the set of trial frequencies.

14. A method for jointly detecting a frequency and unique word for a wireless signal, the method comprising:
receiving the wireless signal via a satellite;
generating a set of trial sequences, each trial sequence comprising a sequence of symbols generated by frequency correcting the wireless signal as a function of each of a set of trial frequencies;
calculating a unique word correlation as a function of each trial sequence, each unique word correlation having a respective unique word location and unique word correlation magnitude; and
calculating a joint correlation magnitude for each of the set of trial frequencies as a function of the respective frequency correlation magnitude and the respective unique word correlation magnitude for each of the set of trial frequencies, comprising applying a weighting factor to at least one of the respective frequency correlation magnitude or the respective unique word correlation magnitude.

15. The method of claim 14, further comprising:
determining a selected optimal transmission frequency as the transmission frequency associated with the trial sequence having the greatest respective joint correlation magnitude;
determining a selected unique word location as the unique word location associated with the trial sequence having the greatest respective joint correlation magnitude; and
demodulating the wireless signal as a function of the selected transmission frequency and the selected unique word location.

16. The method of claim 14, further comprising:
calculating the set of trial frequencies by:
calculating a plurality of frequency correlation values as a function of the wireless signal, each of the plurality of frequency correlation values having a respective transmission frequency and a respective frequency correlation magnitude; and
selecting a number of the plurality of frequency correlation values as the set of trial frequencies, each of the set of trial frequencies having a respective transmission frequency and frequency correlation magnitude.

17. The method of claim 14, wherein calculating the unique word correlation for each trial sequence comprises:
calculating a trial unique word magnitude by correlating a predetermined unique word with the trial sequence at each of a number of trial unique word locations; and
determining the unique word correlation for the trial sequence by associating the trial sequence with the one of the number of trial unique word locations calculated to have the greatest trial unique word magnitude.

18. The method of claim 17, further comprising:
determining the number of trial unique word locations as a function of a number of symbols-worth of possible start symbol locations for the predetermined unique word,
wherein each of the number of trial unique word locations corresponds to one of the number of symbols-worth of possible start symbol locations for the predetermined unique word.

19. The method of claim 14, wherein calculating the joint correlation magnitude for each of the set of trial sequences comprises:
multiplying a first weighting factor with the respective frequency correlation magnitude to generate an adjusted frequency correlation magnitude;
multiplying a second weighting factor with the respective unique word correlation magnitude to generate an adjusted unique word correlation magnitude; and
adding the adjusted frequency correlation magnitude to the adjusted unique word correlation magnitude to generate the joint correlation magnitude.

20. The method of claim 14, further comprising:
generating a burst sequence by recovering a symbol timing of the wireless signal; and
generating the set of trial sequences corresponding to each of a set of trial frequencies comprises frequency correcting the burst sequence as a function of each of the set of trial frequencies.

21. The method of claim 14, further comprising:
estimate a noise level of the wireless signal; and
adaptively adjusting, as a function of the noise level, at least one of a size of the set of trial frequencies or the weighting factor.

22. A system for communicating a wireless signal, the system comprising:
a first terminal configured to:
  generate a code block comprising a unique word located at a unique word location and a physical layer header identifying signaling information; and
  transmit the physical layer header and a set of data appended thereto as the wireless signal; and
a second terminal, in wireless communication with the first terminal via a satellite, and configured to:
  generate a set of trial sequences, each trial sequence comprising a sequence of symbols generated by frequency correcting the wireless signal as a function of each of a set of trial frequencies;
  calculate a unique word correlation as a function of each trial sequence, each unique word correlation having a respective trial unique word location and unique word correlation magnitude; and
  calculate a joint correlation magnitude for each of the set of trial sequences, by applying a first weighting factor to the respective frequency correlation magnitude and applying a second weighting factor to the respective unique word correlation magnitude.

23. The system of claim 22, wherein the second terminal is further configured to:
  determine a selected transmission frequency being the transmission frequency associated with the trial sequence having the greatest respective joint correlation magnitude;
  determine a selected unique word location as the unique word location associated with the trial sequence having the greatest respective joint correlation magnitude; and
  demodulate the wireless signal as a function of the selected transmission frequency and the selected unique word location to recover the set of data.

* * * * *